UNITED STATES PATENT OFFICE.

LAFAYETTE CRULL, OF HARRISBURG, PENNSYLVANIA.

WALL FACING AND DECORATION.

SPECIFICATION forming part of Letters Patent No. 417,232, dated December 17, 1889.

Application filed November 5, 1887. Serial No. 254,405. (No specimens.)

*To all whom it may concern:*

Be it known that I, LAFAYETTE CRULL, a citizen of the United States, residing at Harrisburg, in the county of Dauphin and State of Pennsylvania, have invented a certain new and useful Wall Facing and Decoration; and I do hereby declare that the following is a full, clear, and exact description of the invention, which will enable others skilled in the art to which it appertains to make and use the same.

The object of my invention is to provide a better wall-surface, whether inside or outside, the same to be weather-proof and anti-dust-collecting.

My invention is applicable to mantel-pieces, panels of wainscot, and in imitation-brick houses. In general, it is to replace wall-surfaces if defaced or marred.

In carrying into effect my improvement I use glass plates of sizes corresponding with fronts of bricks in the wall-surface. These plates I paint on the backs, of any desired color. When well dried, I size the painted side of the plates with shellac varnish or hard oil, and I use a cement for attaching to the wall-surface the duly-prepared plates. For attaching said plates, they are placed in a shallow mold or receptacle and backed on their painted side with a liner of cement, which must have sufficient body to make up for the inequalities of the wall-surface. Said liners of cement are thus made of uniform thickness. The mold is made with a movable bottom or partition. After the plate is in the mold it is filled level full of the cement and deposited on the wall, out of the mold, by depressing the bottom or partition at one operation while applying the mold to the wall. It is specially useful to make duplicate facing on damp wall-bases, which I first coat with asphaltum varnish.

My wall-surfacing is composed of two glass plates, the front plate being backed with a coat of paint, a layer of cement interposed between the paint and the rear plate of glass.

I claim—

A wall-facing formed of two plates of glass, the front plate being backed with a coat of paint of any suitable color or ornamentation, and of a layer of cement interposed between the paint and the rear plate of glass, as and for the purpose described.

LAFAYETTE CRULL.

Witnesses:
 A. BRACKENRIDGE,
 HIRAM M. GRAHAM.